Nov. 28, 1950  K. W. JARVIS  2,532,231
TRAFFIC DETECTOR
Filed May 21, 1949  7 Sheets-Sheet 1

Inventor
Kenneth W. Jarvis
By:— Mann and Brown
Attys.

Nov. 28, 1950 K. W. JARVIS 2,532,231
TRAFFIC DETECTOR
Filed May 21, 1949 7 Sheets-Sheet 3
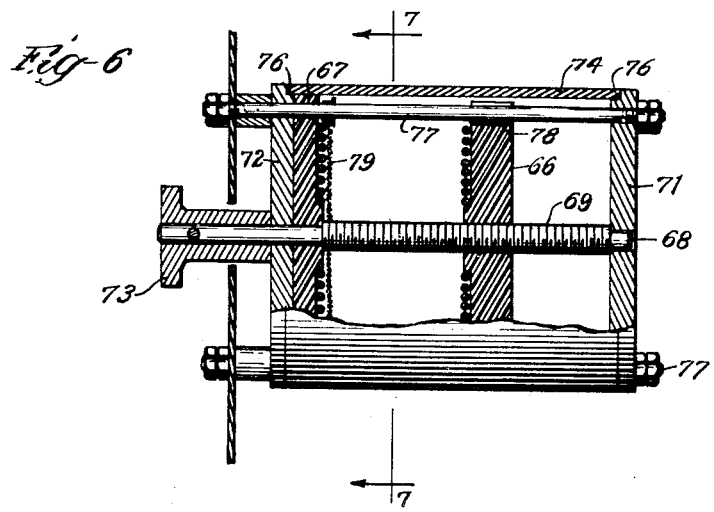
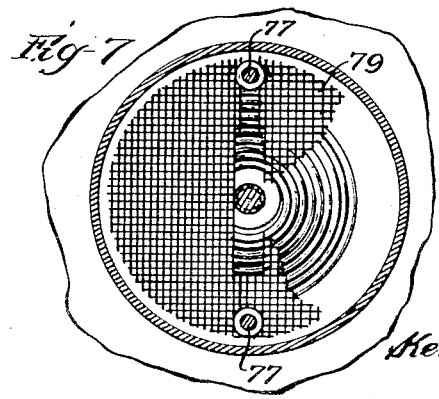
Inventor
Kenneth W. Jarvis
By: Mann and Brown
Attys Nov. 28, 1950     K. W. JARVIS     2,532,231
TRAFFIC DETECTOR
Filed May 21, 1949     7 Sheets-Sheet 4
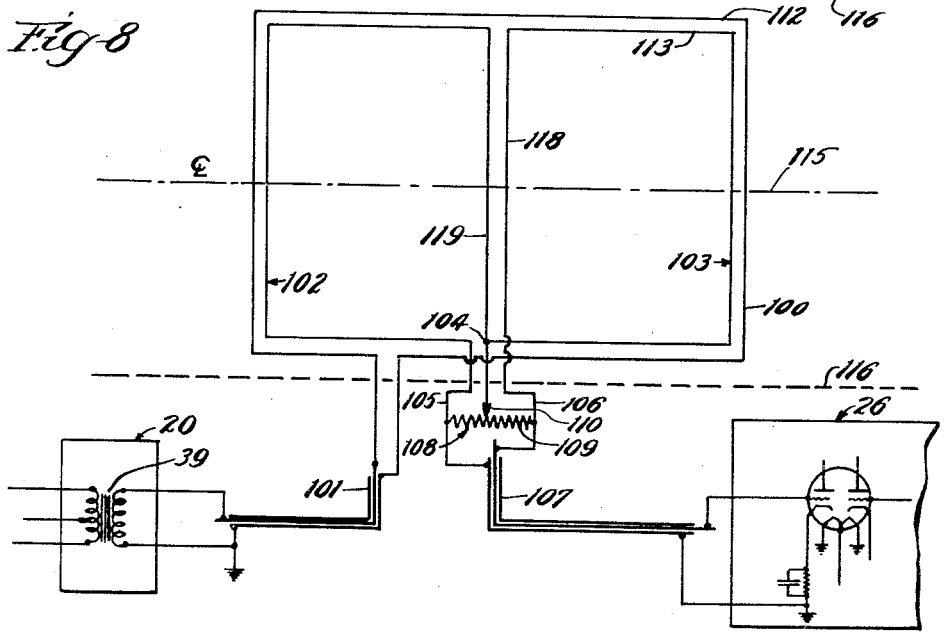
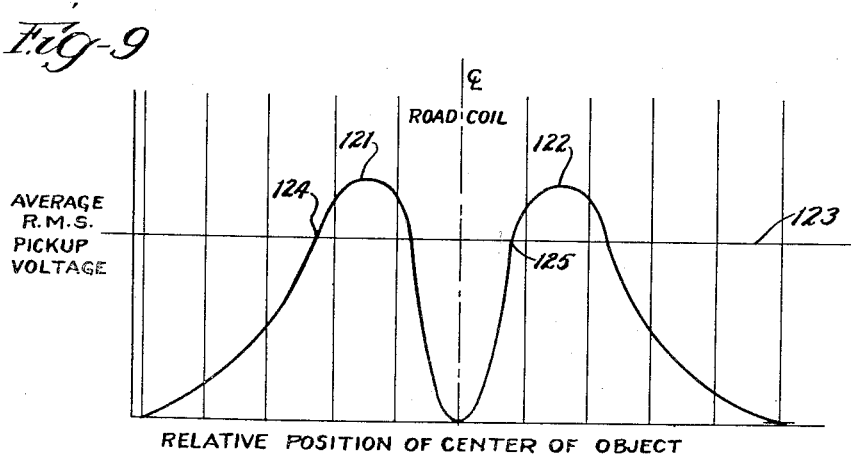
Inventor
Kenneth W. Jarvis
By:- Mann and Brown
Attys.

Nov. 28, 1950     K. W. JARVIS     2,532,231
TRAFFIC DETECTOR
Filed May 21, 1949     7 Sheets-Sheet 5
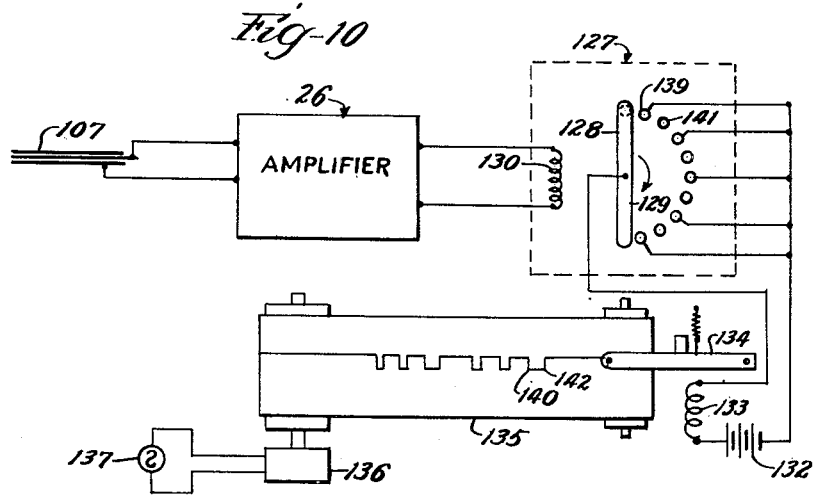
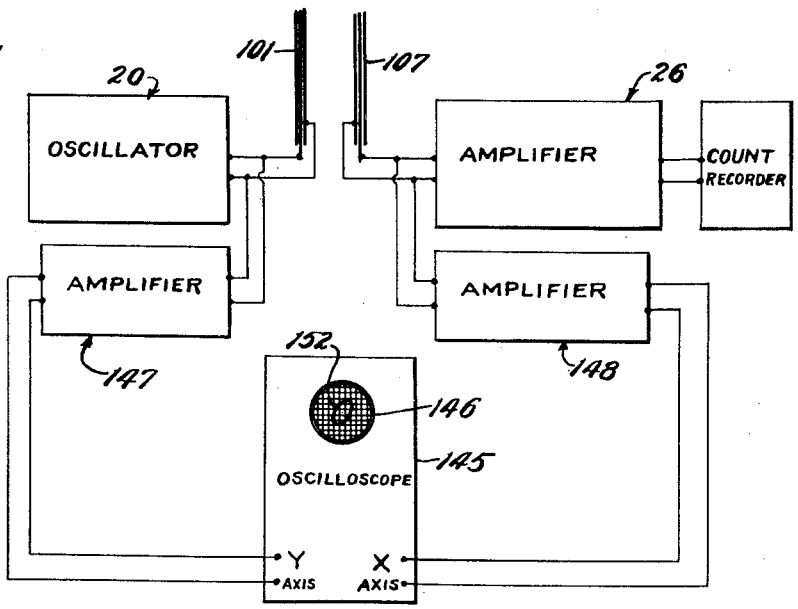
Inventor
Kenneth W. Jarvis

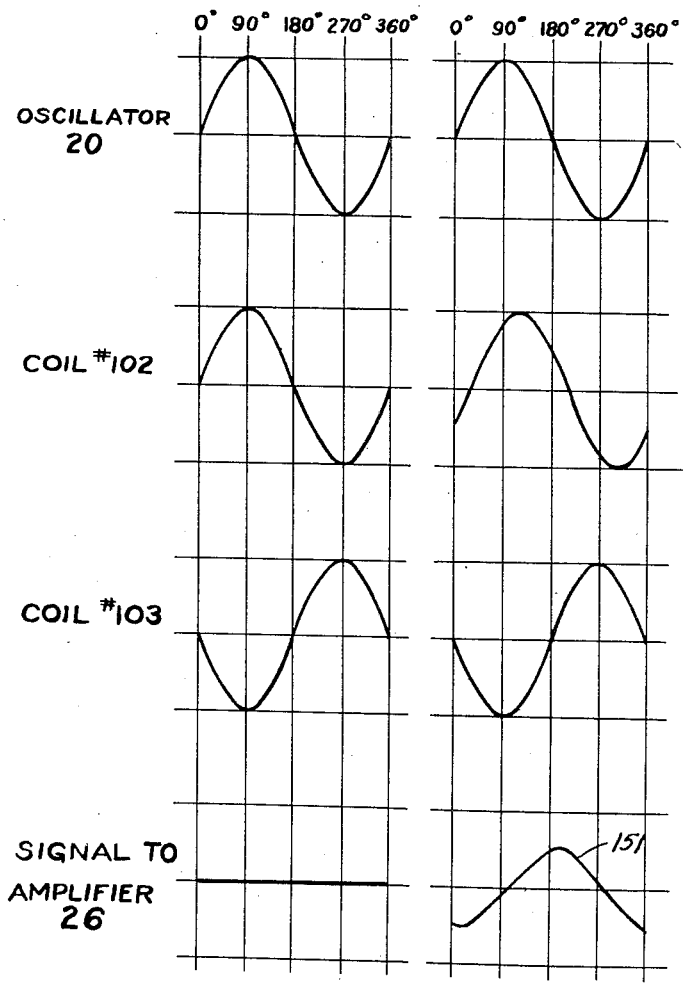

Nov. 28, 1950  K. W. JARVIS  2,532,231
TRAFFIC DETECTOR
Filed May 21, 1949  7 Sheets—Sheet 7
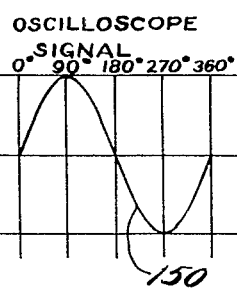
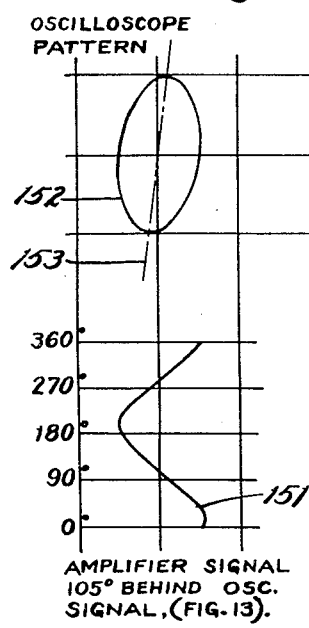
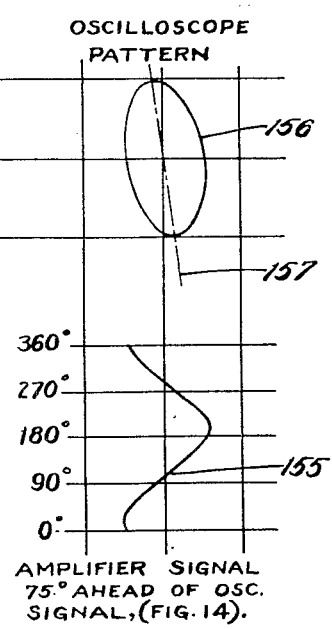
Fig-15
Inventor
Kenneth W. Jarvis
By:-
Mann and Brown
Attys.

Patented Nov. 28, 1950

2,532,231

UNITED STATES PATENT OFFICE 2,532,231

TRAFFIC DETECTOR

Kenneth W. Jarvis, Winnetka, Ill., assignor to Streeter-Amet Company, a corporation of Illinois Application May 21, 1949, Serial No. 94,650

4 Claims. (Cl. 177—337)

My invention relates to a metallic detecting apparatus having a wide range of use, but being particularly suited for use in vehicular traffic control and counting.

At the present time both pneumatic and inductive devices are used in detecting the passage of a vehicle over a particular area of a roadway, but none has been entirely satisfactory for a number of reasons. The pneumatic devices and other mechanical types of detectors have the inherent disadvantage that snow and ice will interfere with their proper operation. Such devices are, furthermore, subject to wear, with a consequent need for continual servicing and maintenance.

The inductive detectors now in use overcome some of the objections to pneumatic and mechanical detectors in that they are not affected by snow and ice, but they are dependent for their operation upon the speed at which a vehicle passes over the designated area, and usually compensating devices must be employed to take into account the different speeds at which vehicles traverse the area.

The present invention overcomes these and other difficulties and provides a detecting unit which is not affected by snow, or ice, or other vagaries of weather; which is not dependent upon the speed at which a vehicle traverses the detecting unit; and which is responsive to the passage of non-ferrous metallic bodies over the detector as well as ferrous bodies.

In addition to detecting and counting metal articles, the invention also has the advantage that it may be used to determine the speed at which a metal article traverses a given point. In addition, it may be utilized to determine the direction of travel on ways such as highways where vehicles are passing in two directions.

The detecting unit of this invention has the added advantages of being simple in construction, requiring little maintenance, and being suitable for use either as a permanent or a temporary installation.

Other objects and advantages will become apparent as the disclosure proceeds and the description is read in conjunction with the accompanying drawings, in which Fig. 1 is a perspective view of a pair of detecting coils in a roadway and showing a diagrammatic form of apparatus illustrative of the present invention;

Fig. 6 is an elevational view of the balancing coil with a portion thereof in section;

Fig. 7 is a section taken at line 7—7 of Fig. 6;

Fig. 8 is a schematic diagram of a second embodiment of the invention;

Fig. 9 is a diagram illustrating the signal strength changes as a symmetrical metal article traverses the coils illustrated in Fig. 8;

Fig. 10 is a diagrammatic representation of an apparatus for making speed determinations with the detector of Fig. 8;

Fig. 11 is a diagrammatic representation of an apparatus for determining the direction of travel of the vehicle or the like with the detector of Fig. 8; and Figs. 12 through 15, inclusive, are diagrams used to explain the method by which direction of travel determinations are made.

The description of preferred embodiments of this invention, and their application to traffic control or counting systems is merely for the purpose of illustration, as the invention may be variously embodied within the scope of the appended claims.

The present application is a continuation-in-part of my prior application, Serial No. 44,300, filed August 14, 1948, now abandoned.

In the broadest sense the present application teaches the use of a detection apparatus in which a signal from an energy generator is transmitted to a signal responsive device through two separate paths, the signal through one of these paths being equal and opposite to that through the other path whereby under normal conditions the two signals will substantially balance each other out and will cause no actuation of the indicating apparatus. Therefore, when the signal transmitted through one of these paths (hereinafter referred to for convenience as "the detector") is varied in effective strength or by being shifted in phase with respect to the signal transmitted through the other of the paths (hereinafter referred to as "the balancer"), the balance originally created will be disturbed and actuation of the indicator will result. While it is convenient to refer to one path as the "detector" path and a second path as the "balancer" path, it will be seen from the following description that one path may act as both a detector and a balancer, depending upon whether the metal object is adjacent that path or the second path respectively.

Such a method of detection has several distinct advantages over methods heretofore employed, particularly in the detection of vehicles. In the well-known prior methods of electrical detection the indicator was operated by the E. M. F. generated as a result of the magnetic field variations caused by the passage of a vehicle constructed primarily of ferrous components. Thus, the signal strength to the indicator was a direct function of the number of lines of magnetic force which were caused to cut the detector, or, putting it another way, a direct function of speed of the vehicle. Thus if the speed of the vehicle were low, detection became a difficult problem.

In the present instance the signal strength to the indicator is function of the power output of the energy generator and the extent of the unbalance between the detector and the balancer. Therefore, even though under particular conditions only a very small amount of unbalance may be obtained between the signal transferred through the detector and the signal through the balancer, the strength of the signal to the indicator may be made sufficiently large to operate the indicator merely by using an energy generator having a large power output.

Since it is an unbalance in the energy transfer which results in actuation of the indicator, the unbalance may be created by objects which are moving at a very slow rate of speed or which may even be at rest.

Figure 1:
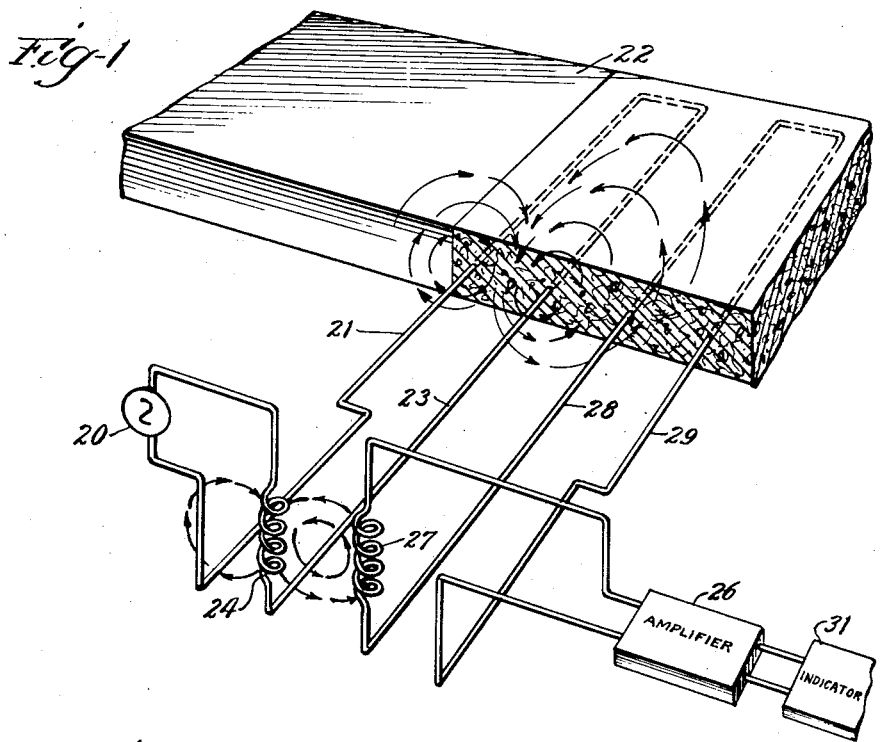

A general method of vehicular detection is illustrated diagrammatically in Fig. 1. A generator 20 produces a pulsating current which flows through one wire 21 of a primary road coil embedded in a roadway 22. The current returns through a second wire 23 of the primary road coil and through the primary 24 of a balancing coil to the generator 20. The secondary winding 27 of the balancer is in series with a second road coil comprising wires 28 and 29, which is connected to an amplifier 26. An indicator 31, or other suitable device to be operated by the passage of vehicular traffic, is connected to the amplifier.

The primary road coil formed by wires 21 and 23, along with the secondary road coil formed by wires 28 and 29, make up the detector, while the balancer is composed of coils 24 and 27. Coils 24 and 27 of the balancer are so connected with relation to the detector that the energy transferred through the balancer is in opposition to the energy transferred through the detector. In other words, the pulsating current flowing through the primary side of the detector and the balancer in series with the generator 20 will create varying magnetic fields about the detector and balancer, which in turn will generate a voltage in the secondary side of the detector and balancer, but the coupling is such that the voltage generated in the secondary of the detector will be opposite in polarity (180° out of phase) to that generated in the secondary of the balancer, and by adjusting the coupling between primary coil 24 and secondary coil 27 of the balancer, the voltage generated in the secondary coil 27 of the balancer is made equal to voltage generated in the secondary of the detector coil, and thus there will be no resultant energy received in the amplifier.

When this balance is upset by the passage of metallic bodies in the vicinity of the detector, a portion of the energy from generator 20 will be received by amplifier 26 and after amplification will be used to actuate indicator 31. The upset may be caused by a phase shift in the voltage wave generated in the secondary of the detector coil as compared with the voltage wave being generated in the secondary 27 of the balancing coil, or it may be caused by a change in the strength of the voltage being generated in the secondary of the detector coil in relation to the voltage being set up in the secondary of the balancing coil.

While the applicant is not certain of the quantitative variations that underlie the operation of this apparatus in the detection of vehicular traffic, it is believed that the following explanation substantially accounts for its operation. This explanation is based upon the assumption that the metal portions on the car act in a manner similar to a closed conducting loop.

Figure 2:
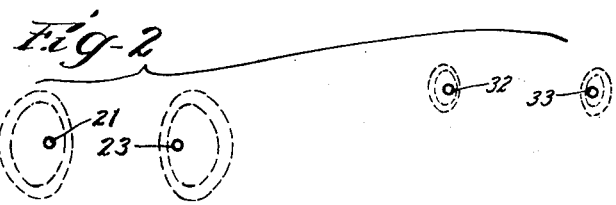
Figs. 2, 3 and 4 are diagrams illustrating the changes which presumably occur in the magnetic fields about the detection coils resulting in operation of the indicator.
Figure 3:
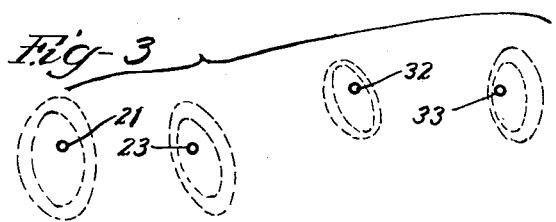
Figure 4:
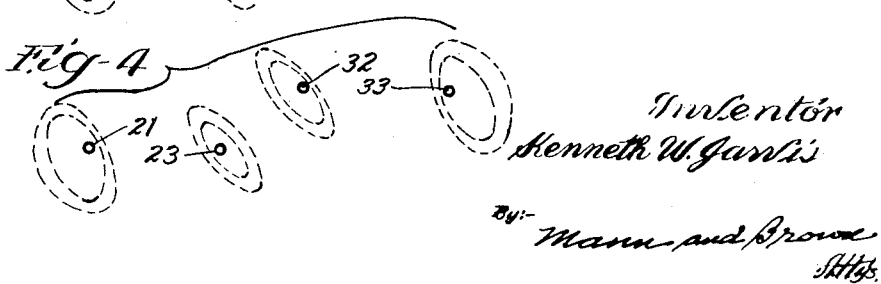

In Figs. 2, 3 and 4 there is shown an end view of wires 21 and 23 with a diagrammatic representation of the flux about these wires due to the flow of a current in the wires from generator 20. Similarly, wires 32 and 33 are two sides of a closed loop of a conductor, which is gradually approaching the road loop or detector from the right. The oscillating field about the road loop set up by signal generator 20 induces a current in the closed conductor, of which wires 32 and 33 are two sides. This current in the closed conductor, in turn, creates a magnetic field about the conductor, which field will be in opposition to the field about wires 21 and 23. As the metallic body represented by the closed loop approaches closer to the road coils, the current induced in the closed loop will become greater and will create an increasingly greater field in opposition to the field about wires 21 and 23. The process of an increased bucking field, as the enclosed loop approaches the road coil, is illustrated by the successive diagrams of Figs. 2, 3 and 4. An unbalance is thereby created, causing actuation of the indicator.

The creation of an unbalance by the closed loop in approaching the road coil may be postulated as being either one, or the sum of several, related effects: (1) the bucking of the magnetic field about the closed loop, wires 32 and 33, causes decreased energy transfer between the primary and the secondary of the road coil; or (2) in setting up a magnetic field about the closed loop energy has been absorbed from the magnetic field about the road coil, thus resulting in decreased energy transfer between the primary and secondary of the detector; or (3) a further effect is that the action of the closed loop is to cause a phase shift between the voltage induced in the secondary of the road coil and voltage induced in the secondary 27 of the balancing coil; and (4) it is also possible that there may be a change in the coupling between the primary and secondary of the detector. It is believed that the major effects are the decrease in energy transfer to the secondary coil and the phase shift in the induced voltage in the secondary coil. Notwithstanding whichever of these effects may be the major cause, the result is that the system has now become unbalanced, presumably because there is more energy being transferred across balancing coils 24 and 27 (which have not been disturbed) than there is being transferred from the primary to the secondary of the road coils. If the energy output of the signal generator 20 is large, a very small amount of unbalance will result in a considerable amount of energy being received in the amplifier 26.

In particular embodiments it may be necessary to correct the phasing of the detector, the balancer, or both, in order that the energy transfer will be substantially simultaneous. One such instance may be where the detector is laid on or within a reinforced concrete highway because the iron reinforcing may cause a phase shift in the energy transfer across the detector. In the specific embodiment hereinafter described a phasing resistor is used to make that corection. Another possible method of phase correction would be to bring a metallic element into the balancing magnetic field, sufficient to cause an equal phase shift in the energy transfer across the balancer.

With the foregoing general understanding of the basic concepts of the invention the various individual components that may be used will now be discussed in greater detail. The description of specific embodiments is made in conformity with R. S. 4888 and is in no way in limitation of the invention hereinafter claimed.

The road coils

One of the particular features of the described embodiment is the relative insensitivity of the road coil to varying external conditions other than the presence of metal. The road coils may be unshielded wire, and even if they are resting in a pool of water, there will be substantially no deleterious effect upon the operation of the detector. The road coils may be wire loosely laid in the cement as it is poured or laid across the surface of the roadway. The device is ideally suited for temporary installations, as for instance where spot checks are made of the traffic over a particular stretch of road.

In testing the signal generator and amplifier hereinafter described we have used, among other configurations, road coils made from uninsulated, flat, copper strips having an approximate cross-sectional dimension of ½ by 1/16 inch. A single loop has been used for each of the primary and secondary of the detector coils, with each of the four wires positioned approximately two feet apart. The indicator will be actuated when a piece of metal positioned several feet above the surface of the road is brought to a position above an imaginary line traced approximately a foot outside the wire of the coils.

Using a detector so constructed, a plurality of vehicles which are spaced more than eight feet apart will give a series of separate actuations of the indicator. If the device is to be used where a spacing of objects closer than this critical minimum is generally found to occur and an individual count of each object is desired, the size of the road loops may be reduced. However, it is very seldom that a closer spacing of vehicles will occur on a highway. If detection of only one side of the highway is desired, the closed end of the loops may terminate somewhat before the center line of the highway.

It is, of course, obvious that in many types of cars and trucks, particularly large trucks or semi-trailers, the axles are considerably closer to the roadway than is a large portion of the truck intermediate of the axles. This has resulted in difficulty in some forms of electro-inductive detectors because of the fact that, while the axles were sufficiently strong to induce an E. M. F. in the detector, the intermediate portion of the body would not do so. A large truck passing over a detector would cause an impulse to be generated when the first axle went over the pickup, followed by a period when no E. M. F. would be generated, due to the height of the frame and body of the truck above the pickup, and succeeded by a second indication at the time the rear axle passed over the pickup. A greater count would be indicated than there were cars or trucks actually passing over the detector.

In the embodiment herein described, the detector, when once actuated by the presence of metal, will remain in an actuated position until the metal is removed. Furthermore, the detector coils are sufficiently sensitive to detect the presence of metal at a height considerably above the frame or bed of a large truck or semi-trailer. Therefore, once the indication has been actuated by the metal on the front of a vehicle, no further indications will be made until the vehicle has passed beyond the detector.

Fig. 8 illustrates another embodiment in which two secondary road coils are connected in series opposition and used with a single primary road coil. In this case the secondary road coils or loops act both as detectors and balancers, as will hereinafter be described.

Other variations of the detector coils may be used in particular instances. In some cases additional turns in the primary or secondary coils may be required. In other instances it may be found desirable to use a single wire for each coil, with the wire running across the way or path of traffic and having the outer end of that wire grounded. In such a case, what would be the the return side of the wire at either the generator or the amplifier, as the case may be, also would be grounded. In this latter instance it may be found necessary to insulate the single conductor to prevent premature grounding thereof.

The signal generator

Figure 5:
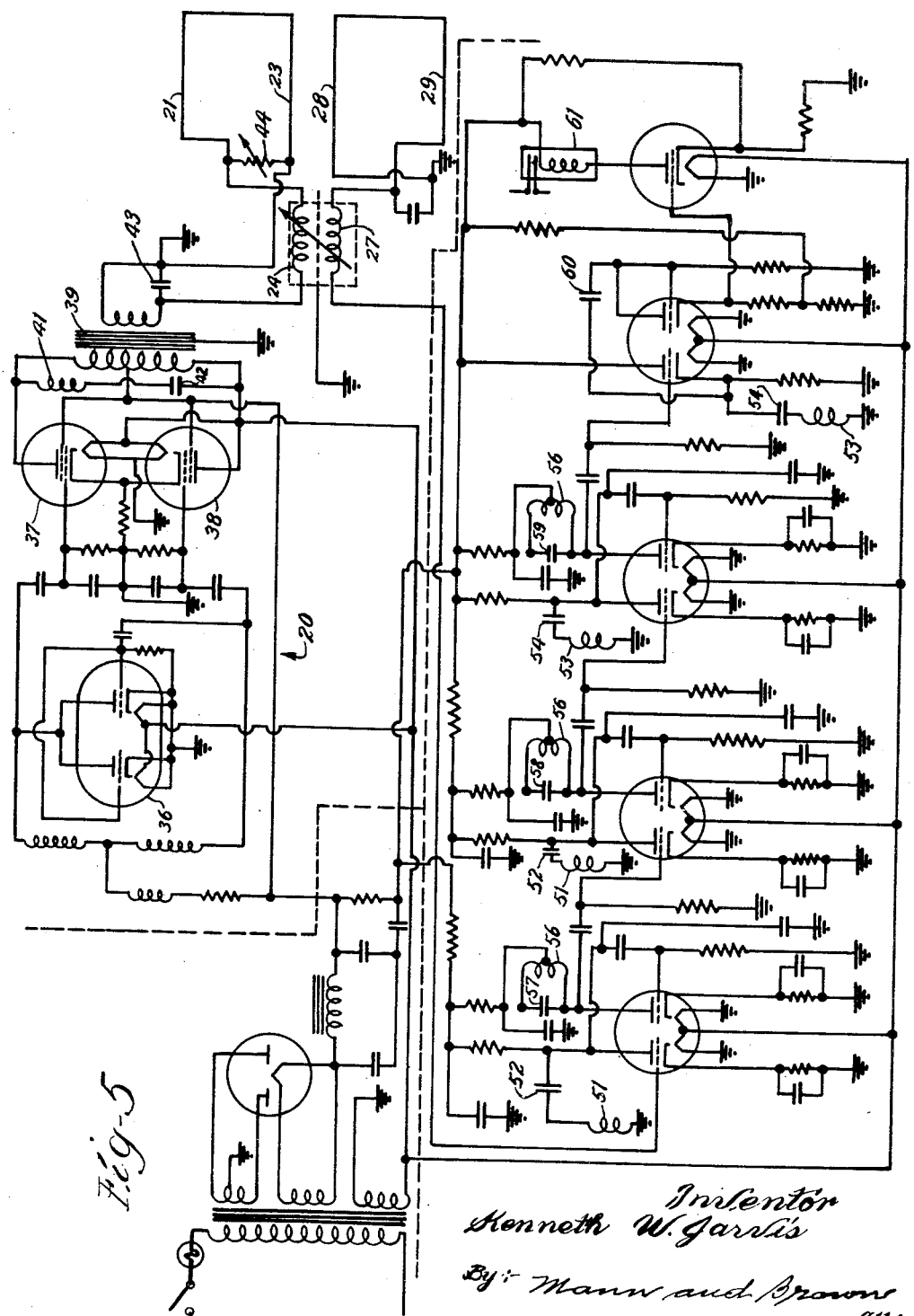
Fig. 5 is a schematic diagram of an embodiment of the invention.

The signal generator illustrated schematically in the upper portion of Fig. 5 is a relatively conventional 10-kilocycle oscillator. A pair of triodes 36 in a single envelope are connected in parallel and as an oscillator to produce the signal. The signal from this oscillator is fed to output transformer 39 through tubes 37 and 38 connected as a push-pull amplifier. A series filter, consisting of a 60-millihenry choke 41 and a 1200-microfarad condenser 42, is connected across the primary of the output transformer 39 to provide additional tuning of the generated signal, and a 10-microfarad condenser 43 may be connected across the secondary of the output transformer. The primary 24 of the balancing coil and the primary of the road coil are in series with the secondary of the output transformer 39.

A 250-ohm variable resistor 44 is connected across the primary of the road coil to permit an adjustment of the phase of the energy transfer across the road coil in order that it might be synchronized with the phase of the energy transfer across the balancing coil. In some instances it may be desirable to make this correction by means of a resistor across the road coil secondary loop, or the primary or secondary of the balancing coil. In any event the object is to bring the two energy transfers into substantially 180° opposition, and depending upon the misalignment that may exist from that desired condition a correction will be necessary in order to arrive at an initial balance.

In the embodiment of Fig. 8 a variable resistor is used in conjunction with the secondary coils, as will be explained hereinafter. With this embodiment no phasing resistor is used across the primary road coil.

The amplifier

The amplifier consists of a 9-stage resistance-capacitance amplifier having special filter provisions to attenuate substantially all signals but those of the frequency of the signal generator. The filtering is necessary to prevent the triggering of the indicator by miscellaneous external signals, and particularly those caused by the ignition system of some motor vehicles.

Amplifier stages 1, 3, 5 and 7 each have a series filter to serve as a trap for signals of a frequency greater than that produced by the signal generator 20. In stages 1 and 3 the series filter consists of a 50-millihenry choke 51 and a 1250-micro-microfarad condenser 52, which are in series from the anode of tube to ground. These traps are particularly effective to attenuate frequencies of approximately 20 kilocycles. In stages 5 and 7 a 30-kilocycle trap is used, consisting of a 24-millihenry choke 53 in series with a 1200-micro-microfarad condenser 54. In stage 5 the trap is connected between the anode and ground, while in stage 7 it is between the cathode and ground.

In stages 2, 4 and 6 a tuned plate circuit is used to give a low response at frequencies above approximately 70 kilocycles. In each case the attenuation is accomplished through the use of a tuned, center-tapped, 160-millihenry choke 56, with one end of the choke being connected to the anode, and with plate voltage supplied at the center-tap. In stage 2 the choke is tuned by means of a 1500-micro-microfarad condenser 57. Choke 56 of stage 4 is similarly tuned, by means of a 1250-micro-microfarad condenser 58, and in stage 6 a 1000-micro-microfarad condenser 59 is used. In each case the condenser is connected in parallel with the choke.

A cathode-follower connection is used in stage 7 with the anode of stage 8 receiving its signal from the cathode through a .004 microfarad condenser 60. The transformer effect of such a cathode-follower stage makes its use desirable.

The electron discharge device of stage 8 has the anode and the grid tied together to act as a diode rectifier. This gives a D. C. voltage for operation of the ninth, or last, stage of the amplifier and will prevent any tendency of the output relay 61 to flutter when it is approximately at the threshold of operation. As soon as the anode of stage 8 has a 4 or 5 volt positive peak voltage thereupon, the diode will begin to pass current, which in turn will cause a sufficient current flow through the ninth stage to result in the pickup of output relay 61. It will be quite obvious that relay 61 may be used to operate any desired indicating instrument, such as a counter, traffic signals or the like. I have found a 10,000-ohm relay to be very satisfactory.

The remaining components of the circuit probably require no further explanation. Four 12AU7 tubes, consisting of a pair of triodes in a single envelope, are used for the first 8 stages, and the ninth stage is one-half of a 6J6 tube. A cathode bias resistor of 1500 ohms with a bypass condenser of $\frac{1}{10}$-microfarad is used in the first 6 stages. A load resistor of 82,000 ohms is used in stages 1, 3 and 5, while in stages 2, 4 and 6 a 22,000-ohm resistor is placed in the anode circuit in series with one-half of each of the chokes 56. A 250-micro-microfarad coupling condenser is used between all stages from 1 to 7. Stages 2 to 6 inclusive have a $\frac{1}{10}$-megohm grid resistor. In stage 7 a 6800-ohm cathode resistor and a 330,000-ohm grid resistor are used. In stage 8 a 22,000-ohm resistor is connected between the anode and ground, while to the cathode is connected a 330,000-ohm resistor followed by a 1500-ohm resistor to ground with the connection between the two being connected to the plate power supply through a 100,000-ohm resistor. The cathode of the ninth stage is connected to ground through a 1500-ohm resistor and is connected to the plate power supply through a 50,000-ohm resistor.

The balancing coil

As has previously been explained, the balancing coil is adjustable in order that the coupling between the primary and secondary of that coil may be varied to obtain an energy transfer equal to the energy transfer between the primary and secondary of the road coils. The balancing coil is connected in the circuit in such a manner that the equalized energy transfer will be in a direction in opposition to that of the energy transfer through the road coils.

While a number of methods of achieving this result might be used, the form of balancing coil shown in Figs. 6 and 7 has been found to be very satisfactory. In this embodiment the primary and secondary coils are each helically wound on the face of a round block of insulating material, and one of these blocks 66 is mounted in such a manner that it may be moved toward or away from the other of the blocks 67. This is accomplished by threading an axial opening in block 66 and mounting that block on a rod 68, having external threads 69 thereon suitable to engage the internal threads of block 66. The rod 68 is journalled in end walls 71 and 72, and a knob 73, pinned to one end of shaft 68, permits the shaft to be rotated. A cylindrical shell 74, which is received in a circular notch 76 provided in each of end walls 71 and 72, acts as a spacer for the end walls. A pair of longitudinal rods 77, having nuts threaded onto either end thereof, hold the shell and end walls in assembled condition. A notch 78 in either side of block 66 allows the block to move longitudinally with respect to the rods 77, and serve the further purpose of preventing rotation of the block as threaded rod 68 is rotated.

To prevent any change in capacitance or possible electro-static effects between the primary and the secondary of the coils a shield in the form of a screen 79 is interposed between the primary and secondary windings. Screen 79, together with metallic end walls 71 and 72 and metallic shell 74, are all grounded. Preferably, rod 68 is made of a non-magnetic material, and if of metal, this is likewise grounded.

Combined detecting and balancing coils

In the embodiment illustrated in Fig. 8 a single primary road coil 100 is connected to output transformer 39 of oscillator 20 by means of a coaxial cable 101. Two secondary coils or loops, generally 102 and 103, are wired in series opposition with a common connection 104 and two external leads 105 and 106. The two external leads 105 and 106 are wired to the input of amplifier 26 by means of a coaxial cable 107. A balancing potentiometer, generally 108, is connected to the secondary loops with its resistor 109 attached to leads 105 and 106 and with the sliding contact 110 connected to the common point 104 between the two secondary coils.

Any suitable form of wire may be used for the road coils, but it has been found to be advantageous, as a matter of simplicity, to use two insulated wires enclosed in a braid, such as is sometimes termed "Romex" cable, for adjacent pairs of wires, such as wire 112 forming one side of primary coil 100 and adjacent wire 113 forming one side of secondary coil 103. A groove may be cut in the surface of the highway and the braid-covered cable installed therein and finished over by pouring melted asphalt up to the surface of the road. On installations in new highways the coils may be laid before the surface of the road is placed.

Preferably, the two secondary coils 102 and 103 are approximately 4 feet wide, as measured parallel to center line 115 of the highway. The ends of the coils may be spaced approximately one foot from the curb lines 116 of the highway. If separate detectors are used for each lane of a two-lane highway, the outer ends of the coils are preferably spaced approximately 2½ feet from the center line 115 of the highway, making a total spacing of 5 feet between the two pickups.

The preliminary balancing is performed before wire 118 of coil 103 and wire 119 of coil 102 are fixed in place. As has previously been pointed out, the adjacent pairs of wires, such as wires 118 and 119, are fabricated from a pair of insulated wires enclosed in a braid. This facilitates the balancing procedure.

A milliammeter is inserted in the plate circuit of the last tube of the amplifier 26 between the plate of the tube and coil of relay 61. The oscillator and amplifier are both turned on and sliding contact 110 of potentiometer 108 is set at the midpoint of resistor 109. The braid cable, enclosing wires 118 and 119, is moved in a direction parallel to center line 115, first in one direction and then in the other until the point is found at which the reading of the milliammeter in the plate circuit of the last tube of the amplifier is at a minimum. After each movement of the cable to give a minimum meter current the sliding contact 110 may also be adjusted to give an even lower minimum value of meter current. Potentiometer 108 is primarily inserted to obtain phase balance, but it will also cause voltage changes which, if large, may have to be rebalanced by again shifting the braid cable enclosing wire 118 and 119.

The braid cable enclosing wires 118 and 119 is now fixed in place (the remainder of the detector coils previously having been fixed in place). Any additional balancing that may be required, such as might be caused by slight shifting of the wires of the detector, may be corrected by adjusting slider 110 of potentiometer 108.

While it is desirable from the standpoint of simplicity and ease of operation to use a potentiometer for the phasing resistor 108, it will be apparent from the foregoing description that separate variable resistors may be used across either or both of the secondary loops 102 and 103.

Fig. 9 is a diagram illustrating the changes in the average R. M. S. voltage delivered to amplifier 26 as a symmetrical metal object traverses the pickup of Fig. 8. It will be seen that there are two peak voltage conditions (peaks 121 and 122 of the curve of Fig. 9) which occur when the metal object has primarily a maximum effect upon each of secondary loops 102 and 103, respectively, with a rebalance occurring midway therebetween. Inasmuch as the distribution of metal on an automobile, for example, is not symmetrical and is spaced at varying distances from the road, the curve of Fig. 9 will vary, depending upon the metal distribution and spacing of the vehicle traversing the pickup. The two peaks 121 and 122 of the curve of Fig. 9 will normally appear, but the hollow between the two peaks will generally not reach zero voltage (or rebalance) because the shift in energy transfer and the phase shift will not coincide. Also the peaks 121 and 122 may vary in relative maximum strength.

Speed determination

If the average R. M. S. voltage curve is determined for a given object, it is possible to utilize the double peak of effect to determine the speed at which the object traverses the pickup. With the curve of Fig. 9 assume that the amplifier and relay are adjusted so that a pickup voltage, equivalent to that indicated by line 123, is required before the relay is actuated. The relay will be actuated twice for each object traversing the pickup; the first actuation occurring when the point 124 is reached on the curve, and the second actuation of the relay occurring when the point 125 is reached on the curve. The length of the time interval between the actuation occurring at point 124 and the actuation occurring at point 125 will be a function of the speed of the object over the pickup. It will be apparent that other pairs of points on the curve may also be used.

Any number of well known methods for computing elapsed time between two actuations of relay may be used. One possible means by which this may be done is illustrated diagrammatically in Fig. 10. A stepping relay, generally 127, is connected to be actuated in response to impulses received by amplifier 26. Two arms 128 and 129, 180° apart, form wiper contacts. The arms are simultaneously rotated in a clockwise direction, a step from one contact to the next being made in response to each impulse delivered to coil 130 from amplifier 26. One of the arms acts as a wiper contact for the first 180° of rotation, and the second arm acts as the wiper contact for the next 180° of rotation. A circuit is made between every other stationary contact, battery 132, relay coil 133 and wiper arms 128 and 129 with the intermediate contacts of the stepping relay being dead. Coil 123 is adapted to move arm 134, arm 134 having a pen marking device at the end thereof to scribe a line on moving tape 135. The tape is driven over rollers by means of a timing motor, such as synchronous motor 136, powered from a suitable 60-cycle supply source 137.

When point 124 on the curve of Fig. 9 was reached, coil 130 would be energized, causing wiper arm 128 to move one step, making an electrical connection with stationary contact 139, and energizing coil 133 to move the marker pen to one side as to point 140 on tape 135. When point 125 on the curve of Fig. 9 was reached, wiper arm 128 would be moved a second step to dead contact 141, whereupon coil 133 would be de-energized and the pen would return to its normal path from point 142. The elapsed time between points 140 and 142 on the tape would be a function of the speed of the object traversing the pickup.

Direction of travel determination

The pickup of Fig. 8 may be used to determine the direction of movement of the car along a highway because of the fact that the phase of the voltage produced in the two conditions of major unbalance (i. e., peaks 121 and 122 of Fig.

9) is of the opposite sense. By utilizing the phase of the signal from the oscillator 20 as a reference basis, the phase of the voltage of the first unbalance may be compared against this basis to determine whether the vehicle entered the pickup from the left or the right of Fig. 8. Any well known methods of phase reference may be used, but for the purpose of illustration of the principle involved, a diagrammatic illustration of the use of an oscilloscope is made in Fig. 11 and the diagrams of Figs. 12 through 15 inclusive are utilized to demonstrate the principle involved.

The phase of the signal to the amplifier 26 is compared with the phase of the signal from the oscillator 20 by means of an oscilloscope 145 having an opening 146 through which the face of the cathode ray tube is viewed. The oscillator signal is transmitted to the oscilloscope through amplifier 147 and applied so as to cause deflection of the cathode ray spot along one of the two axes of the oscilloscope, such as the Y axis. The signal to the amplifier 26 is transmitted to the oscilloscope through amplifier 148 to produce deflection of the spot along the X axis.

Fig. 12 illustrates a balanced condition. It has been assumed, solely for the purposes of illustration, that the phase of the voltage induced in coil 102 is in phase with the signal from oscillator 20. The phase of the induced voltage in coil 103 is 180° out of phase with that in coil 102 and, thus, with the oscillator signal. Since the induced voltage in coil 103 is equal to, and 180° out of phase with, the induced voltage in coil 102, they cancel out and there is no signal transmitted to the amplifier.

In Fig. 13 it has been assumed that a vehicle has entered the energy area about a pickup from the left sufficiently far to cause a 30° phase lag in coil 102 but not far enough to have any effect upon the phase of the induced voltage in coil 103. In actual practice this phase lag would undoubtedly be accompanied by a reduction in the strength of the voltage in coil 102, but this may be ignored since the diagrams are merely seeking to illustrate the effect of the phase shift change. Due to the phase shift in coil 102, the induced voltages in coils 102 and 103 no longer cancel out and a signal is transmitted to the amplifier, which has a phase lagging that of the oscillator by 105°.

In Fig. 14 it has been assumed that a vehicle entered the pickup of Fig. 8 from the right sufficiently to cause a 30° phase lag in the induced voltage in coil 103 without causing any change in the phase of the induced voltage in coil 102. The result is that a signal is transmitted to the amplifier having a phase leading that of the oscillator signal by 75°.

Fig. 15 illustrates diagrammatically the difference in the oscilloscope patterns when the vehicle enters the pickup over loop 102 and when it enters the pickup over loop 103. The curve 150 of Fig. 15 is the oscillator signal which is applied to the Y axis of the oscilloscope. The curve 151 is the signal transmitted to the oscilloscope when the vehicle enters over coil 102 and corresponds to the curve 151 of Fig. 13. This signal is applied to the X axis of the oscilloscope. Under these conditions the pattern seen on the face of the oscilloscope is represented by curve 152 which is an ellipse, with its major axis 153 displaced to one side of the Y axis of the oscilloscope. (As is well known in the art, the strength of signals 150 and 151 should not cause equal deflection so that an ellipse is formed rather than a circle and the displacement of the axes may be visualized.)

If a signal, represented by curve 155, which leads that of the oscillator signal 150 by 75° in phase is applied to the X axis of the amplifier, a pattern, such as that shown by curve 156, is formed at the face of the oscilloscope. Curve 155 in Fig. 15 corresponds to curve 155 in Fig. 14 produced when the vehicle enters over coil 103. It will be noted that the major axis 157 of the ellipse 156 appearing on the face of the oscilloscope is displaced in the opposite direction (with respect to the Y axis) from the major axis 153 of ellipse 152. Thus, the oscilloscope will indicate the phase difference, and from it can be determined the direction from which the vehicle entered the pickup.

It will be understood that all values given for components of the apparatus here shown and described are purely illustrative.

I claim:

1. In a device of the class described for use at a point along a way, an energy generator, a first conductor forming a primary loop adjacent said point, said first conductor being connected to said energy generator to create an energy field about said loop, apparatus responsive to energy from said generator, and a pair of second conductors connected to said apparatus and forming a pair of secondary loops, said secondary loops being positioned within said primary loop whereby two energy paths are created adjacent said point between said primary loop and said two secondary loops to induce energy in said two second conductors, said two secondary loops being so positioned with respect to said primary loop that the induced energy in said two second conductors is in balanced opposition and substantially no energy is transmitted to said apparatus, whereby metal entering one of said paths will upset said balance and permit energy from said generator to be received by said apparatus.

2. In a device of the class described for use at a point along a way, an energy generator, a first conductor forming a primary loop adjacent said point, said first conductor being connected to said energy generator to create an energy field about said loop, apparatus responsive to energy from said generator, and a pair of second conductors forming a pair of secondary loops connected to said apparatus in series opposition, said secondary loops being positioned adjacent said primary loop whereby two energy paths are created adjacent said point between said primary loop and said two secondary loops to induce energy in said two second conductors, said two secondary loops being so positioned with respect to said primary loop that the induced energy in said two second conductors is balanced and substantially no energy is transmitted to said apparatus, whereby metal entering one of said paths will upset said balance and permit energy from said generator to be received by said apparatus.

3. In a device of the class described for use at a point along a way, an energy generator, a first conductor forming a primary loop adjacent said point, said first conductor being connected to said energy generator to create an energy field about said loop, apparatus responsive to energy from said generator, a pair of second conductors forming a pair of secondary loops connected to said apparatus in series opposition, and a variable resistance element connected in parallel with at least one of said secondary loops, said secondary loops being positioned adjacent said primary loop whereby two energy paths are created adjacent said point between said primary loop and said two secondary loops to induce energy in said two second conductors, said two secondary loops being so positioned with respect to said primary loop that the induced energy in said two second conductors is balanced and substantially no energy is transmitted to said apparatus, whereby metal entering one of said paths will upset said balance and permit energy from said generator to be received by said apparatus.

4. In a device of the class described for use at a point along a way, an energy generator, a first conductor forming a primary loop adjacent said point, said first conductor being connected to said energy generator to create an energy field about said loop, apparatus responsive to energy from said generator, and an energy receiving circuit including a pair of second conductors forming a pair of secondary loops connected in series opposition with one end of each of said conductors forming common connection between said two loops and with the other end of each of said conductors being connected to said apparatus, said two secondary loops being positioned adjacent said primary loop whereby two energy paths are created adjacent said point between said primary loop and said two secondary loops to induce energy in said two second conductors, and a potentiometer with the movable contact thereof being connected to said common connection between said two loops and with the two ends of the poteniometer resistance being connected to said two other ends of said second conductors, said two second loops being so positioned with respect to said first loop and said movable poteniometer contact being so set that said energy receiving circuit is balanced and substantially no energy is transmitted to said apparatus, whereby metal entering one of said paths will upset said balance and permit energy from said generator to be received by said apparatus.

KENNETH W. JARVIS.

REFERENCES CITED

The following references are of record in the file of this patent:

UNITED STATES PATENTS

| Number | Name | Date |
|---|---|---|
| 2,223,992 | Horni | Dec. 3, 1940 |
| 2,347,194 | Holliday | Apr. 25, 1944 |
| 2,441,554 | Barker | May 18, 1948 |
| 2,488,815 | Hailes | Nov. 22, 1949 |

FOREIGN PATENTS

| Number | Country | Date |
|---|---|---|
| 201,126 | Switzerland | Nov. 15, 1938 |